United States Patent [19]

Dybsky et al.

[11] Patent Number: 4,944,818
[45] Date of Patent: Jul. 31, 1990

[54] COMPOSITE ROOFING SUBSTRATE PANEL

[76] Inventors: John M. Dybsky, 711 S. Dearborn, Chicago, Ill. 60605; George A. Erswell, Jr., 5015 Wickford Way, Dunwoody, Ga. 30338; John L. Silvestri, 4 Faith St., Lisbon Falls, Me. 04252; Karl H. Loser, 6925 60th Ave., New York, N.Y. 11378; Craig A. McDonald, 6034 N. Nickerson, Chicago, Ill. 60631

[21] Appl. No.: 93,098

[22] Filed: Sep. 1, 1987

Related U.S. Application Data

[63] Continuation-in-part of Ser. No. 32,325, Mar. 31, 1987, abandoned.

[51] Int. Cl.$^5$ .................. B32B 5/26; B32B 32/00; E04D 5/10; E04D 11/02
[52] U.S. Cl. ........................... 156/71; 156/82; 428/78; 428/190; 428/236; 428/251; 428/285; 428/440; 428/490
[58] Field of Search .............. 428/78, 190, 236; 156/71, 82

[56] References Cited

U.S. PATENT DOCUMENTS

| | | |
|---|---|---|
| 3,853,683 | 12/1974 | Stapleford et al. |
| 4,469,731 | 9/1984 | Saracino ................. 428/68 |
| 4,503,106 | 3/1985 | Cogliano ................. 428/40 |
| 4,503,107 | 3/1985 | Cogliano ................. 428/40 |
| 4,565,724 | 1/1986 | Smits ..................... 428/138 |
| 4,617,221 | 10/1986 | von de Chys ........... 428/139 |

Primary Examiner—James C. Cannon
Attorney, Agent, or Firm—Luedeka, Hodges & Neely

[57] ABSTRACT

A panel for use as a substrate for a torch-down modified bitumen roof membrane is disclosed. The panel comprises a board of combustible material with a pre-applied noncombustible facer sheet. The facer sheet protects the board from burning during installation of the membrane. In a preferred embodiment, the boards comprise cellulosic fibers and the facer sheet comprises a fabric of bituminous coated glass fibers. The panels are provided with a facer sheet overhang along two adjacent edges for overlapping the facer sheets of abutting panels. The panels are disclosed having an asphalt coating on the top of the board and with a rubber-asphalt emulsion adhesive adhering the facer sheets to the board. Also disclosed is a roofing construction and a method of applying the roofing construction incorporating the substrate panels.

20 Claims, 2 Drawing Sheets

COMPOSITE ROOFING SUBSTRATE PANEL

This application is a continuation-in-part of co-pending application Ser. No. 32,325, filed on Mar. 31, 1987, now abandoned.

BACKGROUND OF THE INVENTION

1. Field of the Invention

This invention relates to the art of roofing construction and more particularly to a composite panel for use as a substrate for torch-down roofing membranes and to a roofing construction incorporating such panels.

2. The Prior Art

It has been well known and widely practiced to construct a built-up flat or low-pitched roof by covering the roof deck with alternating layers of felt sheets and molten asphalt. When desired, the deck may first be covered by a substrate of panels known as insulation boards or recovery boards. Such boards, which are frequently made of compressed mats of fibers, are used for thermal insulation of the roof or to provide a uniform surface, particularly when recovering an existing roof. Courses of the boards are secured to the roof deck by nails or other suitable fasteners. Hot, molten asphalt is mopped over the boards, then sheets of roofing felt are rolled out over the asphalt. More asphalt and sheets of felt are applied until the desired thickness is attained.

More recently, the layers of molten asphalt and felt have been replaced by a single ply of a modified bitumen membrane. Such membranes are made of a fabric core carrying a bitumen modified with materials such as fillers, elastomers, surfactants and plasticizers to obtain desired properties. Sheets of the membrane are rolled out over the roofing substrate and are bonded thereto and to adjacent membrane sheets by the direct application of flame from torches or burners.

When, as is frequently the case, the roofing substrate is made of combustible fibers, foams, or other materials, there is the danger of charring, decomposition or even ignition, of the substrate during the torching of the membrane. Accordingly, manufacturers of modified bitumen manufacturers recommend that a noncombustible base sheet be applied over all type of insulation or recovery boards. This is accomplished in the field by rolling out base sheets on the boards and fastening the base sheets to the boards, usually by nailing. The installation of base sheets involves additional costly field labor in the handling, laying down, and fastening of the sheets, and may be especially difficult in windy conditions.

SUMMARY OF THE INVENTION

The present invention affords significant advantages in safety and cost savings by providing a torch-down roofing membrane substrate panel comprising a board having a factory pre-applied, noncombustible, discrete facer sheet adhered to its upper surface. The invention further provides a roofing construction incorporating such panels and a method of applying such a roofing construction.

According to a preferred embodiment of the invention, the board comprises a combustible material such as a compressed mat of cellulosic fibers such as wood fibers. The facer sheet is, in a preferred embodiment, a fabric of glass fibers coated with a bituminous material such as asphalt. In installation, the roof deck is covered with the panels and the panels are mechanically fastened to the deck by conventional means. Modified bitumen membrane is rolled out over the panels and is adhered to the panels by the direct application of flame from burners or torches. The combustible boards of the panels are protected from the flame by the noncombustible facer sheets.

The panels may be advantageously constructed so that the facer sheets are generally coextensive with the board but overhang the boards on two adjacent edges. The overhangs lap over the flush edges of adjacent panels so as to provide additional flame protection for the panel edges.

In the manufacture of a panel according to the invention, the upper surface of the board is first coated with a bituminious material such as asphalt. An adhesive bituminous-elastomer emulsion is then applied to the asphalt-coated surface of the board. Facer sheets are then laid on the boards. Pressure is applied to drive out water and adhere the facer sheets in place. The boards may be manufactured in a batch process using pre-cut boards and facer sheets or in a continuous process using rolls of facer sheeting which is adhered to the boards then cut to size.

The combination of the substrate boards with the facer sheets enables the panels of the invention to incorporate high strength with greater flexibility. The panels are able to accommodate minor surface irregularities of the roof deck while providing a smooth bonding surface for the modified bitumen membrane.

The panels are conveniently dimensioned to allow workers to carry multiple panels, to allow ease in job calculations, and to reduce installation time. One-step fastening of both the boards and facer sheets provides significant savings in installation time and expense as compared to the separately installed boards and base sheets of the prior art, especially when installation is done in windy conditions. The fact that the panels are assembled in the controlled environment of a factory rather than on an exposed roof jobsite allows for close control of facer sheet adhesion and overlap.

Other features and advantages of the invention will be apparent from the description of the preferred embodiment which follows.

DESCRIPTION OF THE PREFERRED EMBODIMENT

Figure 1:
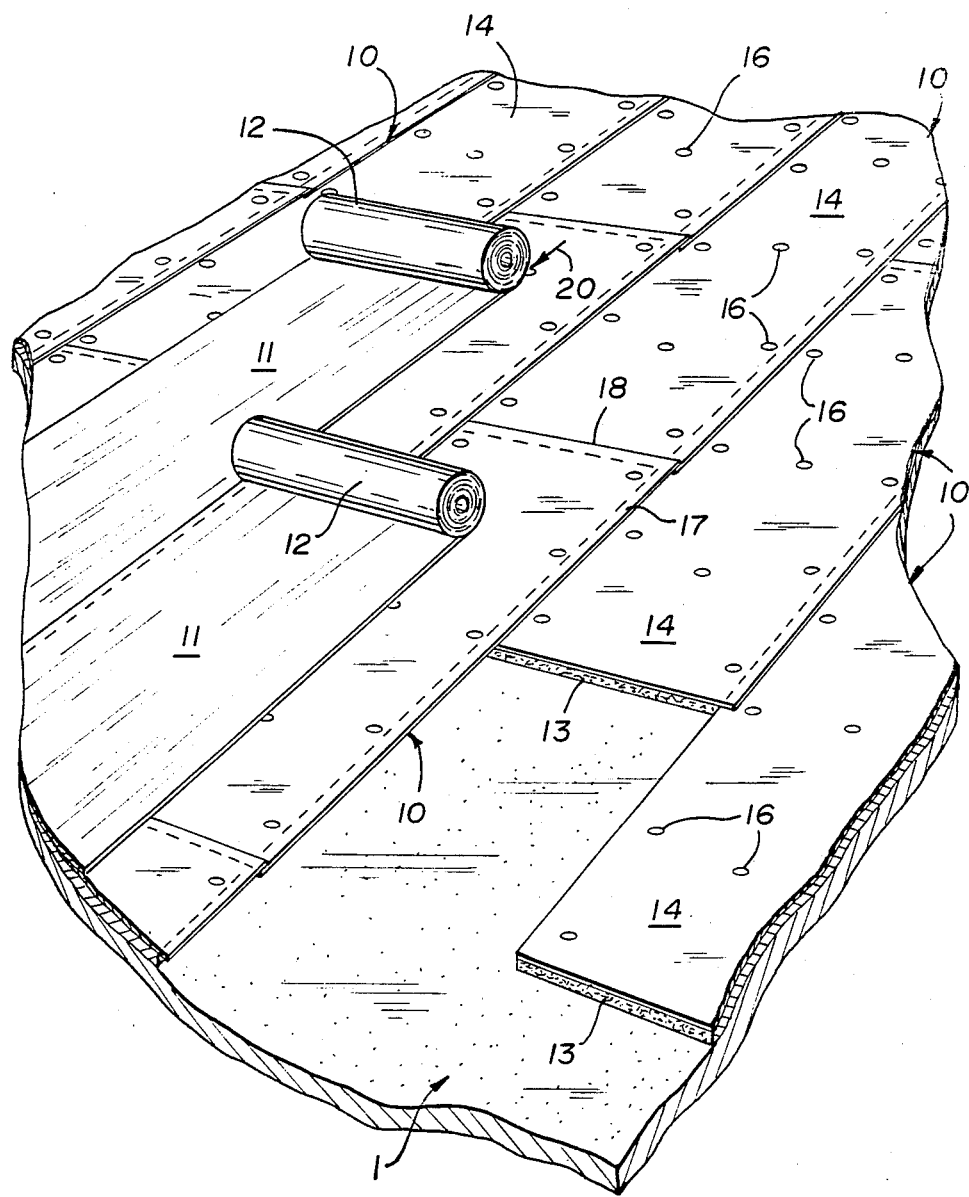
FIG. 1 is a fragmentary perspective view of a partially installed roofing construction according to the invention including composite substrate panels according to the invention.

By way of disclosing a preferred embodiment of the invention, and not by way of limitation, there is shown in FIG. 1 a torch-down modified bitumen membrane roofing construction being installed on an existing roof deck 1 which is substantially flat or low-pitched. The deck 1 may be newly constructed, a deck exposed by the removal of old roofing, oir existing roofing in suitable condition for recovering.

The roofing construction includes parallel adjacent courses of abutting substrate panels 10 covered by overlapping strips of modified bitumen membrane 11 laid down from rolls 12. Each panel 10 comprises a laterally and longitudinally extending board 13 of compressed wood fibers. Overlyingly adhered to the upper major surface of each board 10 is a facer sheet 14 of asphalt coated glass fiber fabric. The panels 10 are mechanically secured to the roof deck 1 by fasteners such as broad-headed nails 16.

The facer sheet 14 of each panel 10 is generally coextensive with the upper surface of the board while overhanging the board 13 along one longitudinal edge 17 and one lateral edge 18. The remaining edges of the facer sheets are flush with the corresponding board edges. The facer sheet overhanging edges lap over the adjacent facer sheets of abutting panels.

During installation of the membrane strips 11, as the rolls 12 are unrolled, flame is applied to the membrane by torches or burners to make the membrane tacky and bond it to the facer sheets 14 of the substrate panels 10. Flame may be directed at the leading edges of the rolls as indicated by arrows 20. Flame directed in this manner is prevented from charring or igniting the boards 13 by the noncombustible facer sheets 14.

Those skilled in roofing installation will realize that it will be necessary to cut some panels to fit around roof fixtures and about the roof perimeter. Where overhanging edges of the facer sheets have been cut off exposing board edges, the edges should be covered by strips of facer sheet fabric or bitumen membrane before torching.

Figure 2:
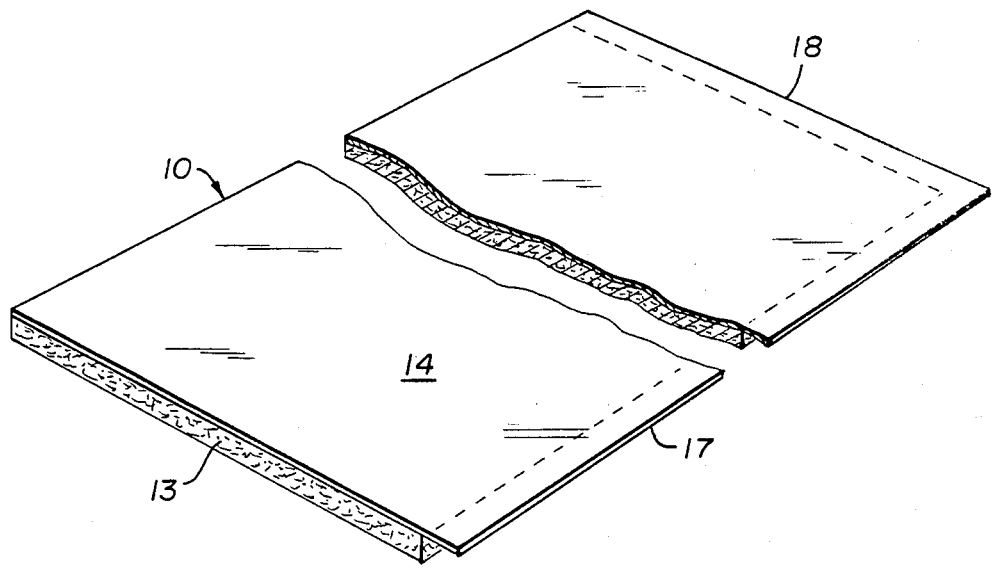
FIG. 2 is a top isometric view of a roofing substrate panel according to the invention.

The construction of the substrated panels 10 is best described with reference to FIGS. 2 and 3. In FIG. 2 it may be seen that each panel is rectangular with upper and lower major surfaces. The lower extent of the board comprises a cellulosic fiber insulating board 10. The board, preferrably formed in a well known manner of a compressed mat of wood fibers, has a thickness of approximately 0.375 inch, a density of approximately 14.0 pounds per cubic foot, and is cut to approximately 35.25 inches in width by 102 inches in length. The board thus has a nominal area of 25 square feet, a size convenient in that four panels will cover 100 square feet, an area which a common unit of measurement in the roofing trade known as a "square".

Figure 3:
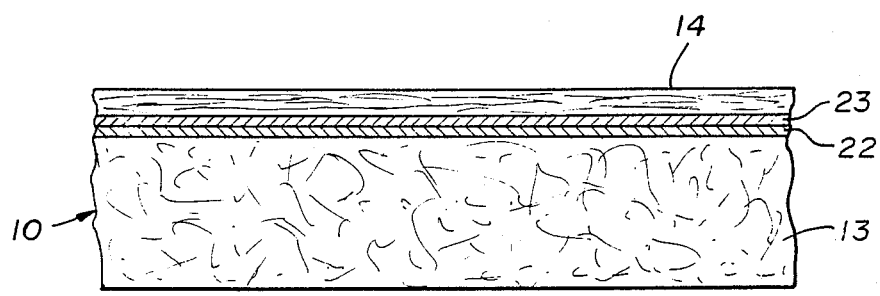
FIG. 3 is an enlarged, fragmentary edge view of the panel shown in FIG. 2.

As best seen in FIG. 3, the upper major surface of the board 10 is coated with an aqueous asphalt emulsion 22. The coated upper surface of the board is further coated with an adhesive 23. The adhesive 23 is a bituminous-elastomer emulsion. In the preferred embodiment, the adhesive 23 is an aqueous emulsion of rubber and asphalt having approximately 72 weight percent solids and a viscosity of 8000 to 10,000 centipoises. A suitable adhesive is sold by the Monsey Products Company designated as product 00-33 GM/FM Laminating Adhesive.

The upper extent of the panel 10 comprises the facer sheet 14. The facer sheet is a nonwoven fabric or asphalt coated glass fibers. In the preferred embodiment, the facer sheet 14 is approximately 0.050 inch in thickness with a weight of approximately 23 pounds per 100 square feet. Suitable fabric is available from Tamko Asphalt Products, Inc.

The presence of asphalt in the board coating 22, the adhesive 23, and the facer sheet 14 provides for additional fire resistance in addition to water repellancy.

As best shown in FIG. 2, the facer sheet 14 overhangs the board 13 by approximately 0.75 to 1.25 inch along one longitudinal edge 17 of the panel and one lateral edge 18. Along the remaining two edges the facer sheet 14 is flush with the board 13.

The panels 14 may be manufactured in a batch process in which precut boards 13 are first coated with the asphalt emulsion 22. The adhesive 23 is then coated on the board and precut facer sheets 14 are laid on the board with two adjacent edges flush with corresponding board edges. The thus laminated panels are stacked and placed in a press where the stack is pressed to drive out water and adhere the facer sheets to the boards. It is suitable to press the panels at approximately 15 psi for approximately 30 minutes.

Alternatively, the panels may be manufactured in an in-line, continuous process. The boards are coated, adhesive is applied, and the upper surface is preheated. A roll of facer sheeting is placed on advancing boards flush with one longitudinal edge of the board. The laminations are pressed in rolls than the facer sheeting is cut flush with one lateral edge of the board and overhanging the other lateral edge and a longitudinal edge.

In addition to substrate boards of cellulosic or wood fiber, the invention may be practiced with other combustible substrate materials including, but not limited to, foamed polyurethane, expanded polystyrene, or mineral substances having combustible binders or heat-decomposable particles such as perlite. The significant property of the eligible substrate material is its combustibility such as by ignition, charring, or decomposition.

While the invention has been described with reference to specific embodiments, it is to be understood that the invention may be practiced with various modifications and variations without departing from the scope of the claims which follow.

What is claimed is:

1. For use as a substrate for a torch-down roof membrane wherein the membrane and substrate are bonded together by the application of torch-generated heat applied to surfaces of the membrane and substrate, a composite panel comprising:
   a board of lateral and longitudinal extent with upper and lower major surfaces, said board formed of a combustible material which is capable of igniting, charring or decomposing when exposed to torch-generated heat, and
   a facer sheet overlyingly adhered to the upper surface of said board for providing the uppermost layer of said panel, said facer sheet being formed of a fabric of bituminous coated noncombustible fibers so that the uppermost layer of said panel resists ignition, charring or decomposition when exposed to torch-generated heat during the bonding of the torch-down roof membrane to said panel.

2. The panel of claim 1 wherein said board is formed of a mat of combustible fibers.

3. The panel of claims 1 or 2 further comprising a bituminous coating on the upper surface of said board.

4. The panel of claim 3 further comprising a layer of a bituminous-elastomer adhesive disposed between said coated board upper surface and said facer sheet.

5. The panel of claim 4 wherein said adhesive comprises a rubber-asphalt emulsion.

6. The panel of claim 2 wherein said combustible fibers comprise cellulosic fibers.

7. The panel of claims 1 or 2 wherein said fabric comprises asphalt coated glass fibers.

8. The panel of claims 1 or 2 wherein the edges of said facer sheet are flush with a first pair of corresponding adjacent edges of said board and overhang a second pair of corresponding adjacent edges of said board.

9. In a roof construction which includes a roof deck, a substrate on said roof deck and a modified bitumen roofing membrane overlying and forming a bond with the underlying substrate by the direct application of flame to the membrane and the substrate, the improvement comprising the provision of a substrate which includes:

a plurality of adjacent courses of composite substrate panels, each of said panels comprising a board of lateral and longitudinal extent with upper and lower major surfaces and a facer sheet overlyingly adhered to the upper surface of the board for providing the uppermost layr of each panel, said board being formed of a combustible material which is capable of igniting, charring or decomposing when exposed to flame-generated heat, and said facer sheet being formed from a fabric of bituminous coated noncombustible fibers so that the uppermost layer of said panel resists ignition, charring or decomposition when exposed to flame-generated heat during the bonding of the modified bitumen roofing membrane to the substrate panels.

10. The roofing construction of claim 9 wherein said board is formed of a mat of combustible fibers.

11. The roofing construction of claims 10 or 9 further comprising a bituminous coating on the upper surface of said board.

12. The roofing construction of claim 11 further comprising a layer of a bituminous-elastomer adhesive disposed between said coated board upper surface and said facer sheet.

13. The roofing construction of claim 12 wherein said adhesive comprises a rubber-asphalt emulsion.

14. The roofing construction of claim 10 wherein said combustible fibers comprise cellulosic fibers.

15. The roofing construction of claims 10 or 9 wherein said fabric comprises asphalt coated glass fibers.

16. The roofing construction of claims 10 or 9 wherein the edges of each said facer sheet are flush with a first pair of corresponding adjacent edges of each said board and overhang a second pair of corresponding adjacent edges of said board, said overhanging edges of said facer sheet overlapping the flush facer sheet edges of adjacent panels.

17. For use as a substrate for a torch-down roof membrane wherein the membrane and substrate are bonded together by the application of torch-generated heat applied to surfaces of the membrane and substrate, a composite panel comprising:

a board of lateral and longitudinal extent with upper and lower major surfaces, said board formed of a combustible material which is capable of igniting, charring or decomposing when exposed to torch-generated heat, an asphalt coating on the upper surface of said board, a layer of rubber-asphalt emulsion adhesive on said coated board surface, and a facer sheet overlyingly adhered by said adhesive to the upper surface of said board for providing the uppermost layer of said panel, said facer sheet being formed of a fabric of asphalt coated glass fibers so that the uppermost layer of said panel resists ignition, charring or decomposition when exposed to torch-generated heat during the bonding of the torch-down roof membrane to said panel.

18. The panel of claim 17 wherein said board is formed of a mat of cellulosic fibers.

19. The panel of claims 17 or 18 wherein the edges of said facer sheet are flush with a first pair of corresponding adjacent edges of said board and overhang a second pair of corresponding adjacent edges of said board.

20. A method for applying a torch-down modified bitumen membrane roof to a roof deck comprising the steps of:

providing a laterally and longitudinally extending board of combustible fibers;

overlyingly adhering a noncombustible facer sheet to the upper major surface of said board, said facer sheet generally coextensive with said upper surface, thereby forming a panel;

covering said roof deck with a plurality of said panels and fastening said panels to said roof deck; and covering said panels with a modified bitumen membrane while adhering said membrane to said panels by the application of flame.

* * * * *

UNITED STATES PATENT AND TRADEMARK OFFICE
CERTIFICATE OF CORRECTION

PATENT NO. : 4,944,818

DATED : July 31, 1990

INVENTOR(S) : John M. Dybsky, Karl H. Loser & Craig A. McDonald

It is certified that error appears in the above-identified patent and that said Letters Patent is hereby corrected as shown below:

```
Column 2, line 63, "oir" should be -- or --.

Column 3, line 55, delete "or" and insert
-- of --.

Column 4, line 16, delete "than" and insert
-- then --.

Column 5, line 13, delete "layr" and insert
-- layer --.
```

Signed and Sealed this

Fourth Day of February, 1992

Attest:

HARRY F. MANBECK, JR.

Attesting Officer

Commissioner of Patents and Trademarks